May 26, 1936. S. E. ALLEN ET AL Re. 19,978

DISCHARGE HEAD FOR FLUID CONTAINERS

Original Filed June 22, 1933

INVENTORS.
SCOTT E. ALLEN AND
JOHN ELMER RENNERT.
BY Frederick S. Duncan, ATTORNEY.

Reissued May 26, 1936

Re. 19,978

UNITED STATES PATENT OFFICE 19,978

DISCHARGE HEAD FOR FLUID CONTAINERS

Scott E. Allen, Glen Ridge, and John Elmer Rennert, Springfield, N. J., assignors to C-O-Two Fire Equipment Company, Newark, N. J., a corporation of Delaware Original No. 1,974,254, dated September 18, 1934, Serial No. 677,002, June 22, 1933. Application for reissue November 5, 1935, Serial No. 48,438

15 Claims. (Cl. 221—73.5)

The present invention relates to discharge means for containers holding highly compressed fluid, such, for instance, as liquefied carbon dioxide, and an object of the invention is to provide certain safety means for the discharge means.

It is common practice to close carbon dioxide containers with a sealing disk which has to be punctured when it is desired to discharge the fluid. In many cases it is desirable to stop the flow of fluid temporarily, particularly when using a portable container. For instance, in fighting fire it is often necessary to move the container from one location to another in order to apply the stream of fire extinguishing fluid to different strategic points, and not only is it awkward to move the container while the carbon dioxide is discharging, but also it is more economical to permit discharge during such times only as the stream can be used to best advantage. To this end a control valve is sometimes provided for shutting off the flow, this valve being connected with the means for puncturing the sealing disk so that a single operating handle may be used to effect release of the fluid from the container and at the same time to open the control valve.

It is well known that the pressure of the fluid in the container rises with temperature and were no safety vent provided the pressure might build up to a point sufficient to burst open the container. In many cases the sealing disk serves as a safety means because it is usually designed to be ruptured by the fluid pressure when such pressure rises above a predetermined point. This precludes the possibility of generating a pressure sufficient to burst the container. However, when a control valve is provided in the line, the danger of bursting of the container or of the discharge line is again present, unless some further safety means is provided. Heretofore, the safety means provided for this purpose have been of two kinds, each involving a second rupturable disk. In one case a safety port communicates with the outlet bore of the container below the sealing disk and this port is closed by a safety disk designed to rupture at a predetermined pressure above normal but below that at which said sealing disk will rupture. In the other case, a safety passage is provided which by-passes the control valve and a safety disk normally closes this passage. Should the pressure rise sufficiently to rupture the sealing disk, the safety disk would also rupture since its rupture point is usually below that of the safety disk and the fluid would then discharge into the main discharge line.

It is an object of the present invention to provide a safety means which dispenses with the use of supplemental safety disks.

It is a further object of the present invention to provide means for normally locking the control valve slightly open so that should the sealing disk be ruptured by a rise of pressure there would be a vent for the fluid around the valve to relieve the pressure.

A more specific object of the present invention is to provide a control valve with a puncturing device whereby when the valve is opened beyond a predetermined extent said puncturing device will engage and rupture the sealing disk, and further to provide means for normally holding the valve partly open with the puncturing device clear of the sealing disk so that the latter cannot be weakened by engagement with or wear against the puncturing device.

Other objects and advantages of our invention will appear in the following description of a preferred embodiment and thereafter the novelty and scope of the invention will be pointed out in the claims.

Figure 1:
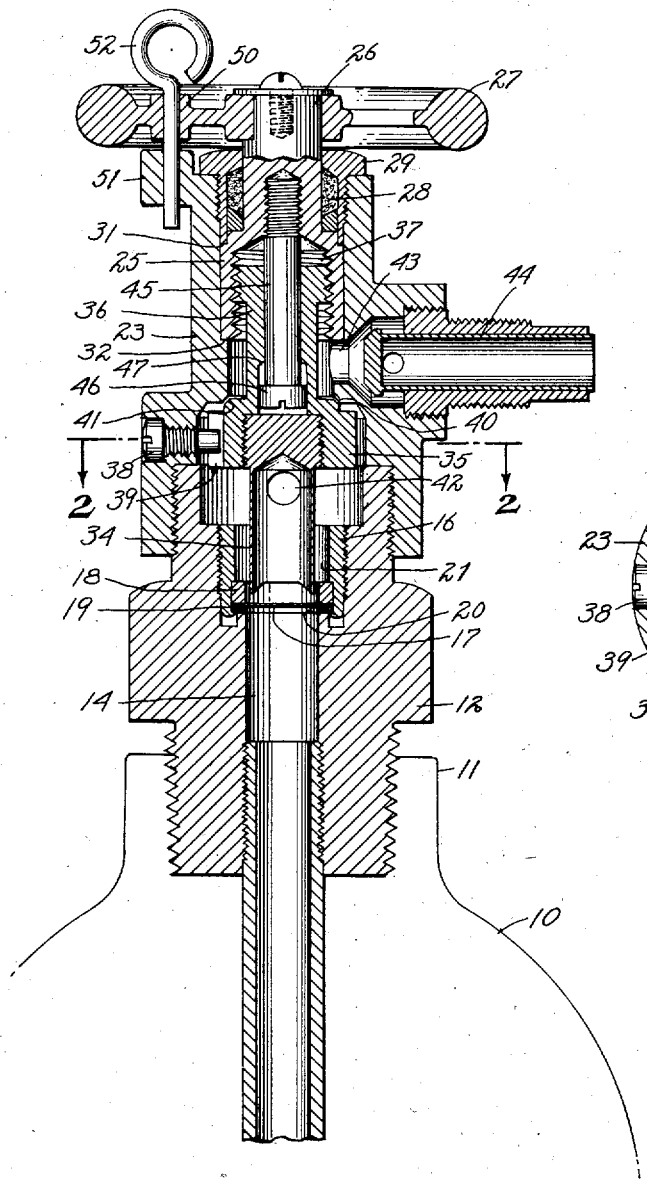
Figure 1 is a view in vertical section of our improved discharge head.
Figure 2:
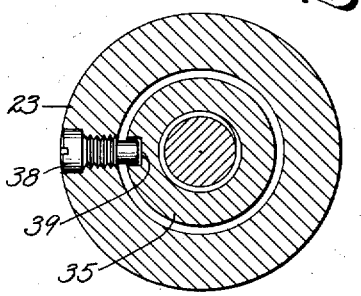
Fig. 2 is a view in cross-section taken on the line 2—2 of Fig. 1.

A portion of a fluid container is indicated at 10 in Fig. 1. Screwed into the neck 11 of the container is a fitting 12 having a discharge bore 14 therethrough. At a suitable point the bore 14 is enlarged and threaded to receive an annular plug 16, which carries a transverse sealing disk 17. The latter is securely clamped between a collar 18 seated in a recess at the lower part of the plug, and a washer 19. The lower end of the plug is peened over the washer so as to secure the latter to the plug. An annular seat 20 surrounds the bore 14 at the bottom of the enlarged portion thereof and upon this seat the washer 19 is seated when the plug 16 is screwed home, so that the sealing disk 17 normally retains the fluid in the container. To facilitate screwing the plug into the fitting, flutes 21 are formed in the inner wall of the plug to receive a wrench.

A tubular casing 23 is threaded upon the upper end of the fitting 12 and within this casing an operating member 25 is mounted to rotate. This operating member has a stem 26 which projects from the upper end of the casing and a hand wheel 27 is suitably fixed to the upper end of the stem. A packing 28 and gland 29 serve to provide a fluid tight seal between the stem and the tubular body 23. The gland 29 which is threaded into the tubular body, is adapted to bear against a shoulder 31 formed on the operating member 25, and the lower end of said member bears against an annular shoulder 32 formed in the bore of the tubular body. Thus, the operating member 25 is held against axial displacement although it is free to rotate.

Slidable in the bore of the plug 16 is a tubular cutter 34 which is threaded at its upper end into the holder 35. This holder has a stem 36 which projects upwardly and is threaded into an axial bore 37 of the operating member 25. A set screw 38 engages a vertical slot 39 formed in the periphery of the holder 35 and prevents the latter from being rotated when the operating member is rotated, although it permits axial movement of the holder. As a result of this arrangement, rotation of the hand wheel 27 results in feeding the tubular cutter 34 up or down as the case may be.

The bore of the body 23 is formed with a beveled annular seat 40 against which a frustoconical valve portion 41 of the holder may be seated. The holder may be moved downward by rotating the hand wheel 27 so that the punch or cutter 34 will rupture the sealing disk. The fluid thus released from the container will flow out of the tubular cutter through one or more ports 42 into the bore of the body 23. Thence it will flow around the valve 41 and out of a discharge port 43 in the body above the valve seat. The discharge port may be provided with a suitable fitting 44 for attachment to a discharge line (not shown). To limit the downward movement of the cutter, we provide a screw 45 which passes through a bore in the stem 36 of the holder and is threaded into the operating member 25. The head 46 of the screw coacts with the shoulder 47 in the bore of the stem 36 to limit downward movement of the cutter 34.

In operation, after the sealing disk has been ruptured by turning the hand wheel 27 in one direction the flow of fluid may be shut off whenever desired by turning the hand wheel in the opposite direction until the control valve 41 is closed. Thereafter when desired the control valve may be opened to resume the discharge of the fluid.

The sealing disk 17 while strong enough to withstand normal fluid pressures is designed to yield when the pressure rises to a predetermined value so that the pressure will be relieved before it can rise to a dangerous degree. The fluid released by rupture of the sealing disk must then be provided with a passage to the discharge line. In order to furnish such a passage we have designed the discharge head so that the valve 41 will be normally maintained in a slightly open position, as indicated at Fig. 1. To this end the hand wheel 27 is formed with an apertured boss 50 which may be brought into alignment with an apertured lug 51 formed on the tubular body 23, and a pin 52 is then passed through the two aligned apertures. When the hand wheel is thus pinned at a predetermined angle with respect to the body 23 the valve 41 will be slightly opened, as shown, and will not obstruct the discharge of fluid which may occur as a result of rupture of the disk 17 due to an abnormal rise of fluid pressure. As long as the hand wheel is pinned in the safety position illustrated there can be no danger of bursting the container or the discharge head. In such safety position the cutter is held clear of the safety disk so that it cannot weaken the disk by wear or pressure of its sharp edge against the disk. The pin must be removed before the safety disk can be ruptured intentionally so that the control valve is always in operative condition when the container is in use.

While we have described a preferred embodiment of our invention it will be understood that this is to be taken as illustrative and not limitative and that we reserve the right to make such changes in form, construction and arrangement of parts as fall within the spirit and scope of the following claims.

We claim:

1. A discharge head for a fluid container, comprising a body formed with a discharge passage for the fluid, an inlet closure and an outlet closure for the passage, a controller for opening and closing said outlet closure at will, means actuable by said controller for opening the inlet closure only after the outlet closure has been opened beyond a predetermined extent, and means normally locking said outlet closure open to an extent less than said predetermined extent.

2. A discharge head for a fluid container, comprising a body formed with a discharge passage for the fluid, an inlet closure and an outlet closure for the passage, a controller for opening and closing said outlet closure at will, means for opening the inlet closure only after the outlet closure has been opened beyond a predetermined extent, the inlet closure being adapted to be opened also by rise of fluid pressure in the container above a predetermined maximum, and means for locking the controller in a position to hold the outlet closure open to an extent less than said predetermined extent.

3. A discharge head for a fluid container, comprising a body formed with a discharge passage for the fluid, a frangible disk normally closing the passage against inlet of fluid from the container thereinto, an outlet valve for the passage, a controller for operating the valve, means for rupturing the disk after the valve has been opened to a predetermined extent, said disk being also rupturable by a rise of fluid pressure in the container above a predetermined maximum, and means for locking the valve open to an extent less than said predetermined extent.

4. A discharge head for a fluid container, comprising a body formed with a discharge passage for the fluid, a frangible disk normally closing the passage against inlet of fluid from the container thereinto, an outlet valve for the passage, a controller for operating the valve, means actuable by the controller for rupturing the disk after the valve has been opened to a predetermined extent, said disk being also rupturable by a rise of fluid pressure in the container above a predetermined maximum, and means for locking the valve open to an extent less than said predetermined extent.

5. A discharge head for a fluid container, comprising a body formed with a discharge passage for the fluid, a frangible disk normally closing the passage against inlet of fluid from the container thereinto, an outlet valve for the passage, a controller for operating the valve means carried by the valve for rupturing the disk after the valve has been opened to a predetermined extent, said disk being also rupturable by a rise of fluid pressure in the container above a predetermined maximum, and means for locking the valve open to an extent less than said predetermined extent.

6. A discharge head for a fluid container, comprising a body formed with a discharge passage for the fluid, a frangible disk normally closing the passage against inlet of fluid from the container thereinto, an outlet valve for the passage, a controller for operating the valve, a punch carried by the valve and adapted to rupture the disk by movement of the valve beyond a predetermined extent, said disk being also rupturable by a rise of fluid pressure in the container above a predetermined maximum, and means for locking said valve partly open with said punch out of contact with the disk.

7. The combination with a fluid container having a discharge port and a closure therefor adapted to rupture upon a rise of pressure of the fluid above a predetermined value, of a casing fitted over said port and having a discharge outlet with a valve seat therein between said port and said outlet, a valve, a controller rotatable to move the valve to and away from seating position against said seat, a punch carried by the valve and adapted to rupture said closure when the valve is moved more than a predetermined distance away from said seat and safety means normally holding the controller in predetermined angular position with respect to the casing such that the valve is partly opened and the punch is out of contact with the disk.

8. The combination with a fluid container having a discharge port and a closure therefor adapted to rupture upon a rise of pressure of the fluid above a predetermined value, of a casing fitted over said port and having a discharge outlet with a valve seat therein between said port and said outlet, a valve, a controller rotatable to move the valve to and away from seating position against said seat, a punch carried by the valve and adapted to rupture said closure when the valve is moved more than a predetermined distance away from said seat, and a pin adapted to lock the controller in predetermined angular position with respect to said casing such that the valve is held partly open and the punch is out of contact with the disk.

9. The combination with a fluid container having a discharge port and a closure therefor adapted to rupture upon a rise of pressure of the fluid above a predetermined value, of a casing fitted over said port and having a discharge outlet with a valve seat therein between said port and said outlet, a valve in the member reciprocable toward and from seating position against said seat, means for preventing the valve from rotating, a controller mounted to rotate in said member, means for preventing axial movement of the controller, a threaded connection between the valve and the controller, a punch carried by the valve and adapted to engage and rupture said closure when the valve is moved more than a predetermined distance away from said seat, means for limiting the extent to which the valve may be moved away from its seat, and means for normally locking the valve in a partly open position with the punch out of contact with the disk.

10. A discharge head for a fluid container comprising a body formed with a discharge passage for the fluid, a frangible disk normally closing the passage against inlet of fluid from the container but rupturable by a rise of pressure in the container above a predetermined amount, an outlet valve for the passage, a controller for operating the valve, a punch movable axially by opening movement of the valve beyond a predetermined extent to rupture the disk, means preventing rotation of the punch as it is moved axially, and means for locking said valve partly open with said punch out of contact with the disk.

11. A discharge head for a fluid container, comprising a body formed with a discharge passage for the fluid, a frangible disk normally closing the passage against inlet of fluid from the container but rupturable by a rise of pressure in the container above a predetermined amount, an outlet valve for the passage, a controller for operating the valve, a punch carried by the valve and adapted to rupture the disk by movement of the valve beyond a predetermined amount, means for preventing rotation of the valve and punch during operation thereof, and means for normally locking the valve partially open with said punch out of contact with the disk.

12. A discharge head for a fluid container, comprising a body formed with a discharge passage for the fluid, a frangible disk normally closing the passage against inlet of fluid from the container but rupturable by a rise of pressure in the container above a predetermined amount, an outlet valve for the passage, a rotary controller for operating the valve, a punch carried by the valve and adapted to rupture the disk by movement of the valve beyond a predetermined amount, and means for preventing rotation of the valve and punch during operation thereof.

13. A discharge head for a fluid container, comprising a body formed with a discharge passage for the fluid, a frangible disk normally closing the passage against inlet of fluid from the container but rupturable by a rise of pressure in the container above a predetermined amount, an outlet valve for the passage, a rotary controller having an axis of rotation disposed in the direction of movement of the valve and arranged to impart movement to the valve in said direction, a punch carried by the valve and adapted to rupture the disk by movement of the valve beyond a predetermined amount, and means for preventing rotation of the punch during operation thereof.

14. A discharge head for a fluid container, comprising a body formed with a discharge passage for the fluid, a frangible disk normally closing the passage, a punch movable axially in the body to rupture the disk, a rotary controller having an axis of rotation disposed in the direction of movement of the punch and arranged to impart movement in said direction to the punch, and means for preventing rotation of the punch during axial movement thereof.

15. A discharge head for a fluid container, comprising a body formed with a discharge passage for the fluid, a frangible disk normally closing the passage, a punch movable axially in the body to rupture the disk, rotatable cam means having an axis of rotation disposed in the direction of movement of the punch and coacting with the punch to cause the axial movement of the punch, manual means for rotating the cam means, and means for preventing rotation of the punch during axial movement thereof.

SCOTT E. ALLEN.
JOHN ELMER RENNERT.